Nov. 18, 1941.  W. N. BRAY ET AL  2,262,792
FORM-FOLDING MACHINE
Filed Jan. 5, 1940   6 Sheets-Sheet 2

INVENTORS.
William N. Bray,
Thomas G. Husband,
By their attorney
Victor Cobb.

Nov. 18, 1941. W. N. BRAY ET AL 2,262,792
FORM-FOLDING MACHINE
Filed Jan. 5, 1940 6 Sheets-Sheet 3

INVENTORS
William N. Bray
Thomas G. Husbands
By their Attorney
Victor Cobb

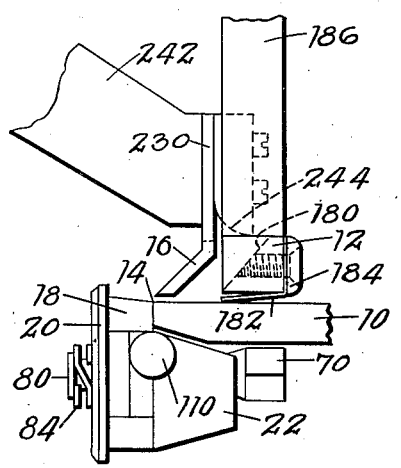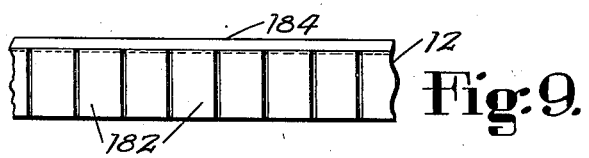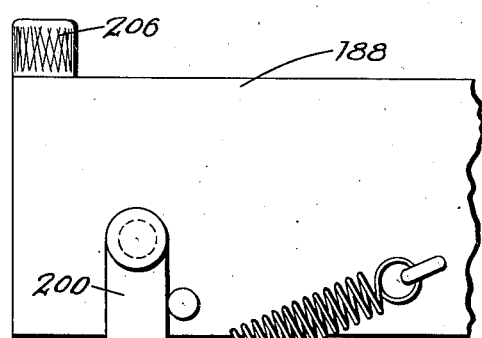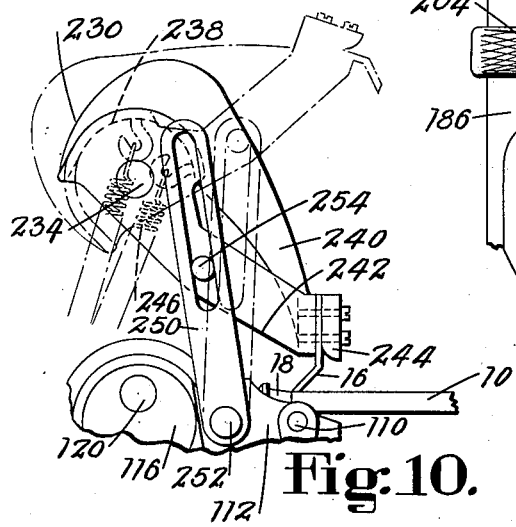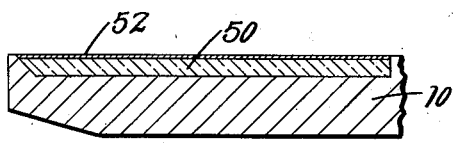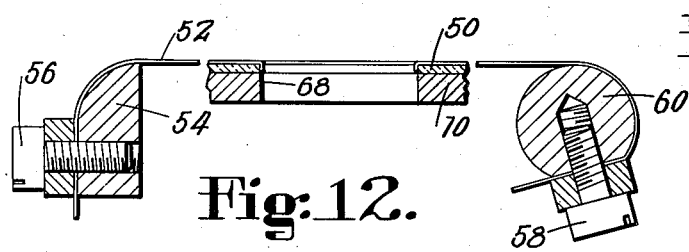

INVENTORS
William N. Bray
Thomas G. Husbands
By their Attorney
Victor Cole

Nov. 18, 1941.                W. N. BRAY ET AL                2,262,792
                            FORM-FOLDING MACHINE
                             Filed Jan. 5, 1940                6 Sheets-Sheet 6

INVENTORS
William N. Bray
Thomas G. ...
By their Attorney
...

Patented Nov. 18, 1941

2,262,792

UNITED STATES PATENT OFFICE 2,262,792

FORM-FOLDING MACHINE

William Neil Bray and Thomas Gimson Husbands, Leicester, England, assignors to United Shoe Machinery Corporation, Borough of Flemington, N. J., a corporation of New Jersey Application January 5, 1940, Serial No. 312,542
In Great Britain January 18, 1939

18 Claims. (Cl. 12—55)

This invention relates to form-folding machines, and in particular to those designed for folding the straight edges of fancy leather goods, such as book covers, handbags, wallets and the like.

Machines of this type are sometimes arranged to effect the folding of margins of the work by means of a folding member which is mounted for movement through 180° to turn up the margin and carry it over against the work, and an important object is to provide an improved machine of this class in which pieces of work having edges longer than the operative portion of the machine may be folded without danger to the overhanging portions.

In carrying out this object and in accordance with a feature of the invention, the folding is effected by a member rotatable by means of, and supported for this movement in, carriers which are displaced with respect to the axis of turning movement. Preferably and as illustrated, a gage plate is displaceably associated with this folder so that it may project beyond the folder at the beginning of the operation and be displaced by contact with the work at the completion of the fold. Means is also provided for returning this gage plate to its initial position during the return movement of the folder.

In accordance with other features of the invention, the machine is provided with a creaser around which the margin of the work is folded and which is moved out of the way as the folding operation is completed. When the work to be treated has a backing member associated with the work piece and around the edge of which the fold is to be made, it is necessary to gage the work by the edge of the backing piece rather than by the edge of the work itself. Still another feature of the invention resides in a power-operated arrangement for moving the folder which permits it to be raised to a position substantially normal to the work support and then stopped, thus permitting the operator to push the backing member against the folder as a gage, after which the movement of the folder may be completed.

These and other features of the invention will now be described with reference to the following specification taken in connection with the accompanying drawings, in which—

Fig. 8 is a side elevation with parts removed and on a large scale to show the relation of the work-engaging elements to one another;

Fig. 9 is a bottom view of a portion of the holddown;

Fig. 10 shows the connection between the plate carrying the folder and the carrier for the creaser and illustrates how the creaser may be raised to inoperative position;

Fig. 11 is a detail view of the latch which limits the upward movement of the holddown;

Fig. 12 is a transverse section through the work table and shows a tensioned metal strip thereon;

Fig. 13 is a front-to-back section through the work table;

Figure 1:
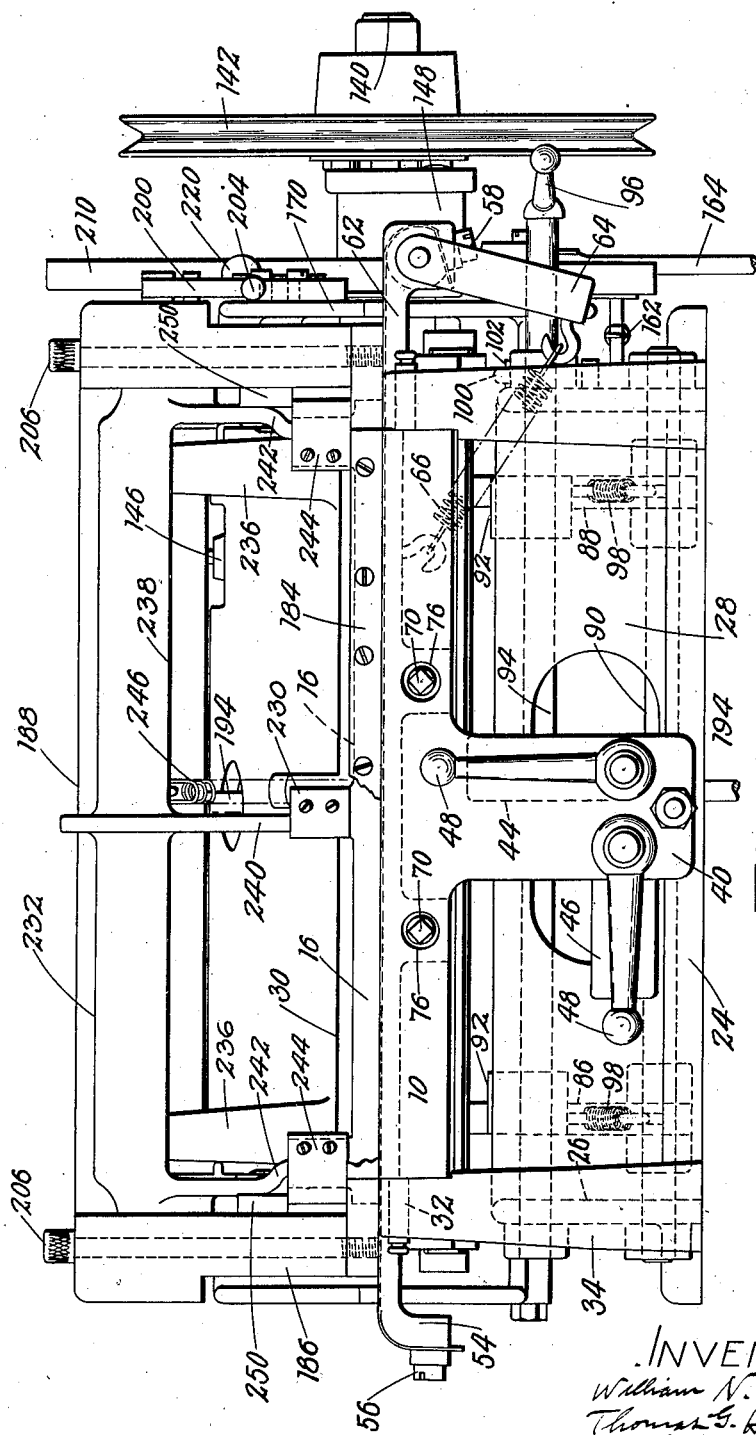
Fig. 1 is a front elevation of the machine.

With a form-folding machine of this type, the work W (Figs. 16 to 20) is clamped in position on a table 10 by means of a holddown 12 and is folded around a line of fold 14 coincident with the edge of a creaser 16 by means of a folder 18. This folder has associated with it a displaceable edge gage 20 and is supported by a carrier 22 having rotational movement in which the top face of the folder is turned through approximately 180°. This movement lifts the margin of the work face to a vertical position and then continues through the balance of the 180° to press the margin against the body of the work as the creaser 16 is moved out of the way.

The machine structure includes a base casting 24 (Figs. 2 and 3) having sides 26 which are interconnected by means of an apertured vertical web 28 and a cover web 30.

The table is pivoted at 32 to posts 34 integral with the front corners of the frame, the inward edge of the table being depressible against the tension of springs 36, and the uppermost position of the table is determined by a stop screw 38 passing through the lower end of a depending arm 40 which is integral with the table. In handling different sorts of work, it will be found desirable to be able to control the effectiveness of the springs 36 and, accordingly, each of these springs extends between a hook 42 in the base (Fig. 2) and fingers 44 and 46 which are pivotally attached to the depending arm 40 and are provided with handles 48 by means of which the fingers may be turned from a position in which the spring is almost in a line between the hook 42 and the pivot 32, thereby having a short, effective turning moment, or to a position such as that of the finger 46 in which the point of attachment of the spring to the depending arm 40 is very much lower in the machine and, hence, has a greater turning moment.

The actual work-supporting face of the table 10 is preferably constructed as shown in Figs. 1, 12, and 13 and has a piece of rubber 50 countersunk in the surface of the table. Over this rubber there is stretched a very thin, metal cover-strip 52, one end of which is clamped to a projecting arm 54 at one side of the table (Fig. 1) by means of screws 56, while the other end is held by screws 58 on a shaft 60 pivoted in an arm 62 extending out from the other side of the table. This shaft 60 is provided with a lever 64 urged laterally to tighten the strip by means of a spring 66. If desired, in order to accommodate buckles or other projections in the work to be folded, the table 10, the rubber, and the strip may have a central aperture 68 (Fig. 12).

The folding of the margin of the work piece W is effected by the folder 18 which is a flattened bar detachably secured to the carrier 22 by square-headed screws 70, so that either the upper face 72 (Fig. 6), which is slightly inclined with respect to the surface of the work table, or the normal face 74 may be employed, as the work conditions demand. It will be seen from Fig. 1 that these screws 70 are accessible through apertures 76 in the front face of the work table. The work of detaching and replacing this folding bar is facilitated by providing additional threads 78 near the ends of the apertures so that the screws 70 will not be wholly separated from the carrier 22 when they are unscrewed from the folder 18.

Figure 2:
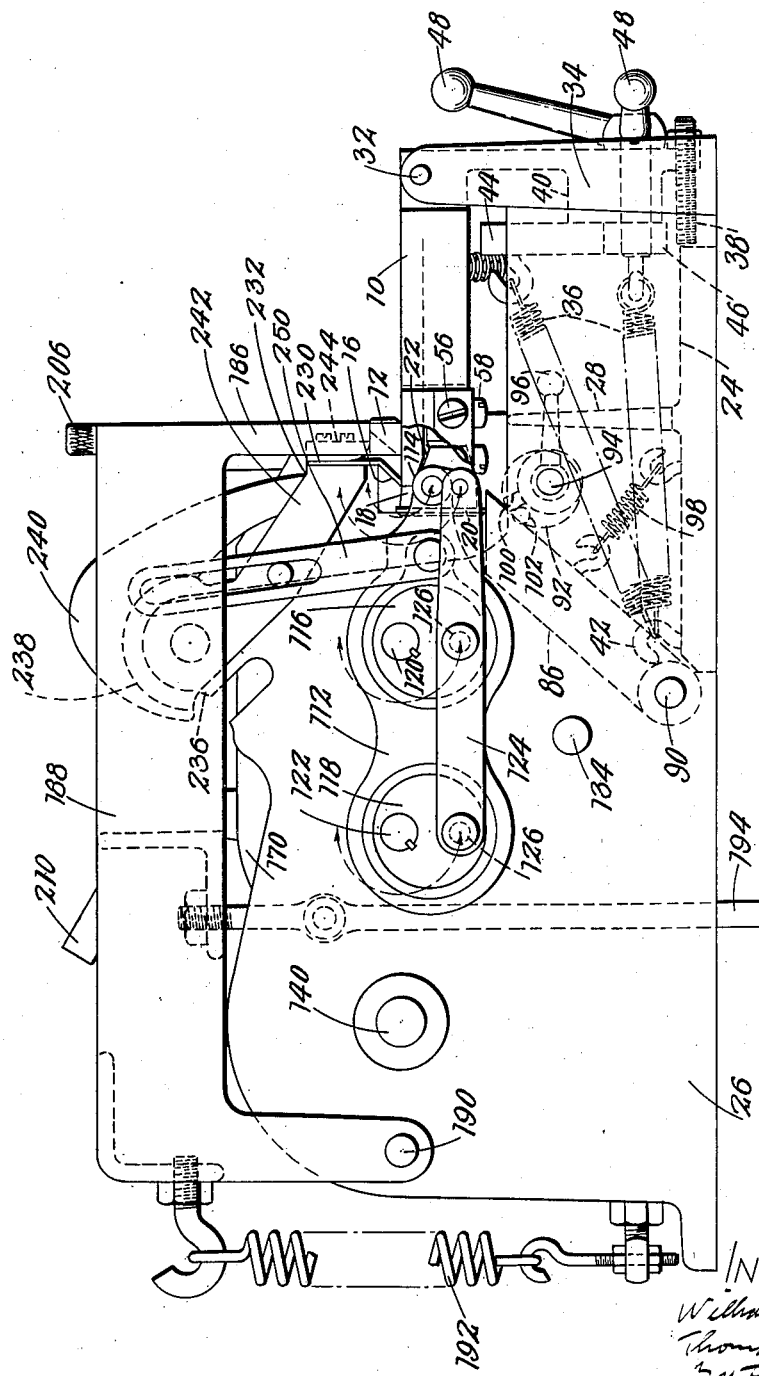
Fig. 2 is a side elevation thereof.
Figure 6:
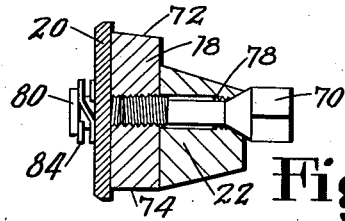
Fig. 6 is a section through the folder bar showing the attaching means therefor.

The location of work pieces with respect to the creaser 16 may be effected by bringing the edge of the work into contact with a gage 20 in the form of a thin plate which is attached to the folder 18 by screws 80 passing through slots 82 in this plate and surrounded by springs 84. This arrangement permits the gage plate to slide with respect to the folder, so that when the folder completes its movement of 180° to the position shown in Fig. 17, the gage plate will be automatically displaced by contact with the work on the table. With this arrangement alone, however, the gage plate would be inoperative after one cycle if no provision were made for returning it to its normal position, as shown in Figs. 2 and 6. Accordingly, the machine is provided with a pair of arms 86, 88 which are pivoted upon a rod 90 extending transversely of the frame near the base. The arms are held up in operative position, where they will contact with the gage plate 20 and return it to its normal position, by engagement with eccentric disks 92 (Fig. 2) upon a crossrod 94 which is provided with a handle 96 at the right side of the machine, so that these eccentric disks may be turned to a position where they will no longer be effective to cause a replacement of the edge gage 20. The arms 86 and 88 are held against the eccentric disks by springs 98. To help the operator in turning the disks to just the desired position, the handle 96 is provided with a projecting pin 100 which will be brought into engagement with a fixed pin 102 on the frame when the parts are in their normal operative position, which is illustrated in Fig. 2.

Figure 5:
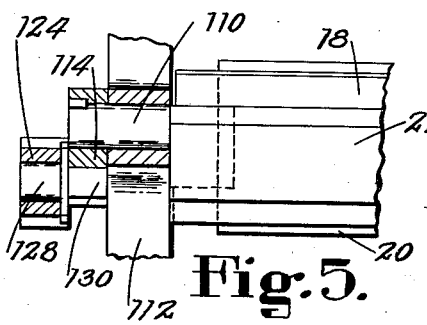
Fig. 5 is a detail view taken in section on the line V—V of Fig. 4.
Figure 4:
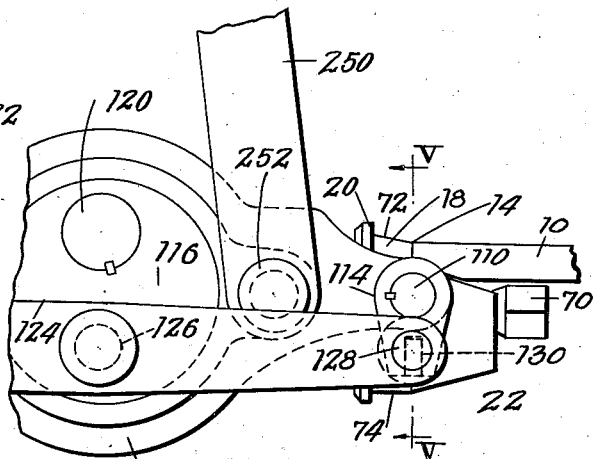
Fig. 4 is a fragmentary view on a larger scale and showing the connection of the driving mechanism to the folder.
Figure 7:
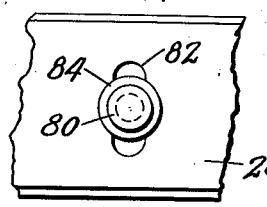
Fig. 7 is a fragmentary view at right angles to Fig. 6 to show the slotted connection of the gage plate to the folder.

Inasmuch as it is desired to make the machine useful for pieces of work larger than the length of the folder 18, it is not possible to provide simple pivots for the support of the folder because such pivots would have to be coincident with the line of fold 14. We have, therefore, provided a mounting for the carrier 22, which gives the desired turning movement through 180° without interfering with laterally extending portions of the work. Accordingly (Figs. 4 and 5), this carrier has, at each end, outwardly extending trunnions 110 which pass through bearings in movable supporting plates 112 and are provided with cranks 114, the lower ends of which are slotted for a purpose which will later appear. The plates 112 each embrace circular eccentric blocks 116 and 118 which are fixed to shafts 120 and 122 extending across the machine and journalled in the sides 26 of the frame. These eccentric blocks 116 and 118 are also arranged to move together (Fig. 2) by a connecting rod 124 attached to the blocks by pins 126, and at the forward end of this rod is a pin 128 having a flattened portion 130 which enters the slot at the lower end of the crank 114.

The shafts 120 and 122 are each provided with pinions engaging a segment 132 (Fig. 3), supported on cross-shaft 134 and oscillated by means of a connecting rod 136 surrounding an eccentric 138 on a drive shaft 140. It will be seen, therefore, that a single rotation of the drive shaft is effective to oscillate the segment 132 and hence to turn the eccentric blocks 116 and 118 to move the pins 126 through a semi-circle and back again. At the same time, the pins 128 at the forward end of the connecting rods are moved through a semi-circle and the trunnions 110 on the carrier 22 are likewise carried in a smaller semi-circular path around the line of fold 14, thus causing the folder 18 to complete a fold.

Figure 3:
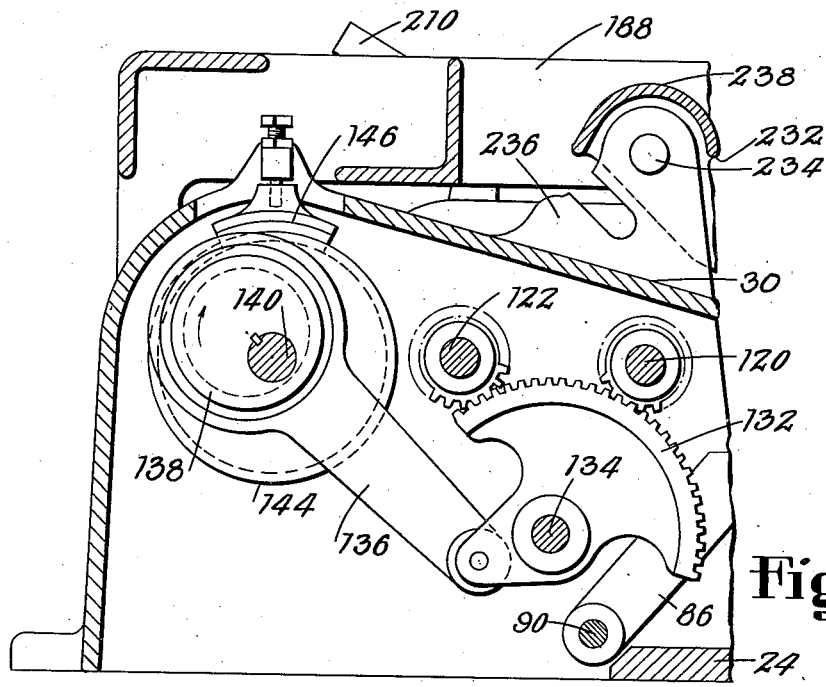
Fig. 3 is a vertical section taken longitudinally of the machine to show the driving mechanism for the folder.
Figure 14:
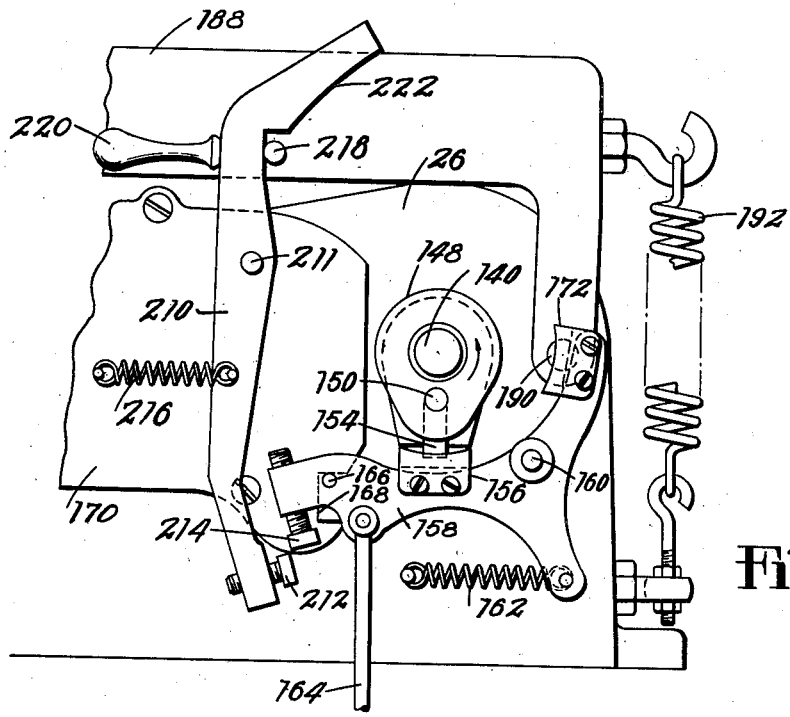
Fig. 14 is a side elevation showing the clutch control mechanism.
Figure 15:
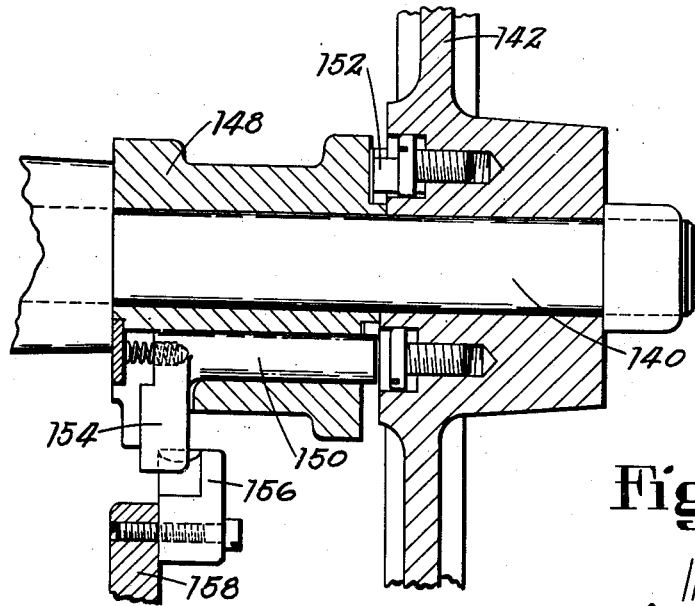
Fig. 15 is a view on larger scale taken in vertical section through the clutch and the drive pulley.

Rotation of the drive shaft 140 is caused by power supplied to a driving pulley 142, and overthrow is prevented by supplying said shaft with a brake drum 144 against which there presses a brake 146 (Fig. 3). The control of the movement of the shaft 140 is effected by a clutch illustrated in Figs. 14 and 15 and having a clutch body 148 in which there is a spring-pressed sliding pin 150 adapted to be brought into engagement with one or the other of studs 152 in the driving pulley. The sliding rod 150 has a depending tail 154 adapted to be engaged to draw the pin 150 back into the body 148 by means of a cam 156 secured to a lever 158 pivoted at 160 in the side 26 of the frame. The clutch lever 158 may be rotated against the tension of a spring 162 by pressing a clutch treadle (not shown) connected to a treadle rod 164, and this movement is limited by engagement of a pin 166 with the side of a slot 168 formed in a detachable cover plate 170 secured to the side of the frame. Under certain conditions, which will be pointed out later in describing the operation of the machine, it may be wished to stop the movement of the drive shaft 140 after it has turned 90°. Accordingly, the clutch lever 158 is provided with another cam 172 which is drawn into the path of the tail 154 of the clutch bolt 150 whenever the treadle attached to the clutch lever is fully depressed. The release of the clutch treadle will then permit the drive shaft to complete a full rotation, whereupon the clutch bolt 150 will again be withdrawn by the cam 156. In case it is not desired to stop the rotation of the shaft at the end of 90°, the treadle may be depressed and at once released, upon the shaft will be given a complete single revolution.

Figure 17:
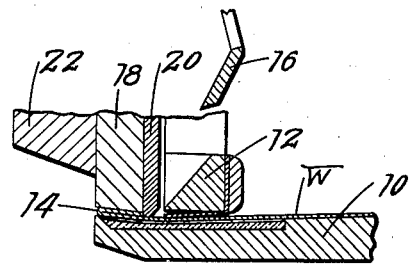
Figure 18:
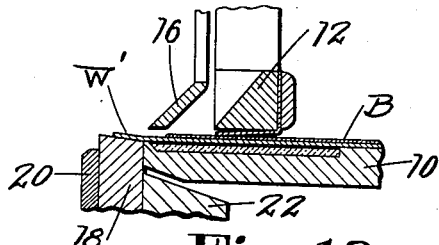
Figs. 18 to 20 illustrate the operation of folding work which has a backing piece.
Figure 19:
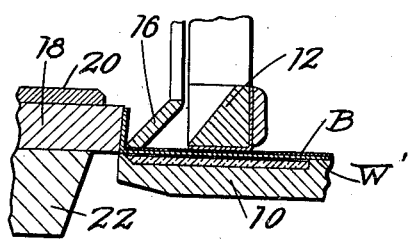
Figure 20:
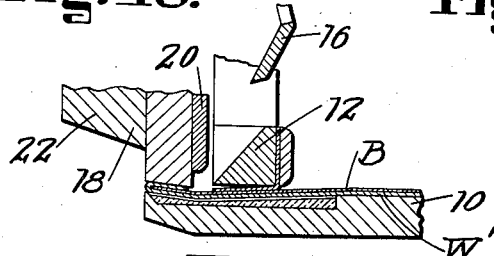
Figure 21:
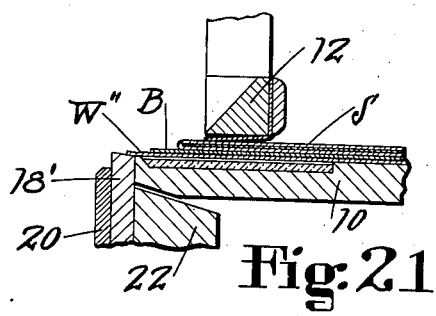
Figs. 21 and 22 show the folding of pieces of work which have projecting, raised overlays or straps.
Figure 22:
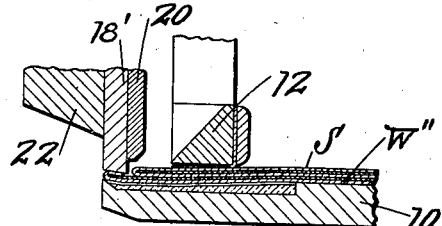

During the folding operation the work is held firmly in position on the table by means of the holddown 12 which comprises a bar extending transversely of the table and which is cut away at 180 to permit the creaser 16 to move out of the way, as indicated in Figs. 8 and 17. On the lower face of the holddown bar is a plurality of flat spring fingers 182 clamped in position on the bar by a screw-attached plate 184, thus assuring a firm clamping of the work piece even though it may not have a uniform thickness. The holddown is mounted on depending portions 186 of a tiltable subframe 188 (Fig. 2). The subframe is pivoted on the main frame of the machine at 190, and the holddown is normally raised away from the surface of the table by a spring 192 at the rear end of the machine, but it may be depressed into engagement with the work by movement of a clamp treadle (not shown) attached to a treadle rod 194. Normally the up-and-down movement of the subframe 188 is limited by a spring-pressed latch 200 (Fig. 11) which engages an adjustably mounted stop 202 carried on the cover plate 170 and provided with a finger piece 204 to permit it to be released when it is desired to move the subframe 188 to a higher position in order to facilitate changing the holddown bar. This bar is attached to the depending portions 186 by means of long screws (Fig. 1), the heads 206 of which are accessible at the top of the subframe. When this is being done, it is desirable to prevent operation of the clutch, and to this end a lever 210 (Fig. 14) is pivoted at 211 on the cover plate 170. At the lower end of this lever is a screw 212 which may be brought beneath a screw 214 on the clutch lever 158. Normally it is held out of the path of said screw by a spring 216 which draws the lever 210 to a position determined by a stop pin 218 which extends out from the subframe 188. However, before the subframe can be lifted to its upper position, the stop lever 210 must be moved against the tension of its spring by taking hold of a handle 220, and when the subframe has been lifted, the pin 218 will engage a curved surface 222 on the stop lever to hold the screw 212 under the screw 214.

The creaser 16 has upwardly extending lugs 230 (Fig. 1) by which it is screw-attached to a support 232 pivoted at 234 (Fig. 3) in flanges 236 extending up from the cover web 30 of the frame. This creaser support is a casting having a curved top portion 238, a center rib 240, and end ribs 242 (Fig. 1). The screws which hold the creaser on its support are also used for attaching blocks 244 (Figs. 1 and 8) which overlie the holddown 12, so that the lifting of the holddown by means of the spring 192 is also accompanied by a lifting of the creaser and, conversely, a spring 246 (Fig. 10) holds the creaser 16 with its blocks 244 against the holddown, so that when the holddown is pressed down by its treadle into engagement with the work, the creaser 16 falls and rests lightly in engagement with the work, its rear edge coinciding with the line of fold 14.

As the folder 18 is turned over, it is necessary to raise the creaser 16 independently of the holddown 12 to get it out of the way. Accordingly, links 250 (Figs. 2 and 10) have been provided which are attached by pins 252 to the folder supporting plates 112. The upper ends of the links 250 are slotted to engage pins 254 projecting laterally from the end ribs 242 of the creaser support, so that as the supporting plate 112 is moved through a semi-circular path by the action of the eccentrics 116 and 118, the links will operate to lift the creaser 16 out of the path of the folder. With certain types of work, the creaser is not needed, and hence the slots in the links 250 are made long enough so that the creaser support may be raised to an inoperative position, indicated by dotted lines in Fig. 10, and when in that position, the spring 246 will have passed the center of the pivots 234 and will hold the creaser in a raised position limited by engagement of the pins 254 with the upper ends of the slots in the links 250.

Figure 16:
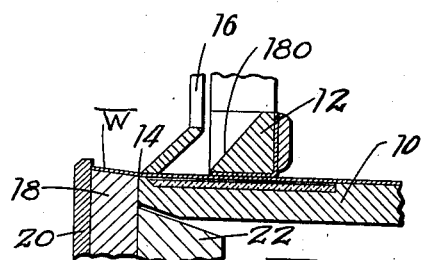
Figs. 16 and 17 show the folding of plain work.

In utilizing the machine for plain work W, the steps of the operation will be normally such as are shown in Figs. 16 and 17. As indicated there, the work is positioned on the table with its margin to be folded overlying the upper face of the folder 18. If a fold of the full width of this face is to be made, then the edge of the work is brought into engagement with the edge gage 20. Depression of the clamp treadle attached to the rod 194 will then bring the creaser 16 and the holddown 12 into the position indicated in Fig. 16 to clamp the work against the table. After this, the clutch treadle attached to the rod 164 will be depressed and preferably immediately released, thereby causing the folder to move to the position shown in Fig. 17, the creaser 16 being lifted by the links 250 and, as the fold is substantially completed, the edge gage 20 will slide along the folder 18 into the relation shown in that figure. The completion of the cycle will cause the folder to move through 180° to return to its initial position, and during the latter part of that movement the gage plate will strike the arms 86 and be brought back into its original relation to the folder. The operator will then release the clamp treadle attached to the rod 194, allowing the holddown to be raised by the spring 192, and this will carry with it the creaser by reason of the blocks 244.

When the work W' has a backing B, the gage plate 20 is allowed to stay in an inoperative position by turning the handle 96 to move to inoperative position the eccentric blocks which support the arms 86. For this sort of folding operation, the work W' will be placed upon the table with its margin overlying the upper face of the folder 18, and the clutch treadle attached to the rod 164 will be depressed and held down. The machine will then travel one-quarter of its cycle, bringing the folder to the position indicated in Fig. 19. The operator will then push the work away from him to bring the backing B firmly against the upstanding portion of the margin of the work resting against the folder and will depress the clamp treadle rod 194, causing the creaser and the holddown to engage the work. If the clutch pedal is then released, the machine will go through the remainder of its cycle, bringing the folder over to the position shown in Fig. 20 and, at the same time, lifting the creaser, after which the folder will return to its initial position and the creaser will drop back against the work. Then, having released the holddown and creaser, the work may be withdrawn.

When work pieces W'' are encountered, which have not only a backing B but which are also provided with some overlying raised portions such as strips S, then it may be found necessary to use a folder 18' designed to make a narrower fold than is noramlly employed, and the creaser may be raised to an inoperative position indicated in dotted lines in Fig. 10. Otherwise the operation will follow that described in connection with Figs. 18 to 20. For this sort of work, the spring plates 182 upon the holddown will be of assistance in accommodating the various thicknesses encountered.

Having thus described our invention, what we claim as new and desire to secure by Letters Patent of the United States is:

1. In a form-folding machine, a work support, a folder having a work-engaging surface forming an extension of the surface of the work support, and means for supporting said folder for turning movement about an axis substantially coincident with the corner of the folder adjacent to the work support, said supporting means being offset with respect to said axis of turning movement in order not to interfere with portions of the work extending beyond the folder.

2. In a form-folding machine, a work support, a folder forming an extension of the work support and turnable through approximately 180° to fold the margin of the work, said folder having laterally extending trunnions out of alinement with the axis of turning movement, means movable through a semi-circular path for supporting said trunnions, and means cooperating with the trunnions to turn the folder during said movement.

3. In a form-folding machine, a work support, a folder positioned adjacent an edge of the work support, said folder having laterally extending trunnions, a carrier for said trunnions, means for moving the carrier to transfer the axis of the trunnions through a semi-circular path extending about the edge of the work support, and a link and crank for turning the folder about the axis of the trunnions during said movement.

4. In a form-folding machine, a work support, a folder having opposite edges arranged in different angular relations to a side surface of the folder, said folder being positioned so that its edge surface forms an extension of the work support to turn up the margin of the work projecting beyond the work support, a movably mounted carrier for said folder, and means for detachably mounting the folder upon the carrier with either edge in operative relation to the work support.

5. In a form-folding machine, a work support, a folder mounted for movement about an edge of the work support to fold a projecting margin of the work back onto the work itself, a gage plate slidably mounted on one face of the folder and projecting above the work-engaging surface thereof whereby it will serve to position the work with respect to the folder and may be displaced by contact with the work as the folder moves through 180° to turn over a margin of the work.

6. In a form-folding machine, a work support, a folder having an edge portion forming an extension of the support, a gage plate displaceably mounted on the side of the folder opposite to said support and adapted to be moved by contact with a piece of work on said support at the completion of the folding movement, and means for returning said gage plate to its operative position where it projects beyond the edge surface of the folder during the return movement of the folder.

7. In a form-folding machine, a folder movable to turn a projecting margin of the work over onto the body of the work, a creaser, means biasing said creaser downwardly against the work to determine the line of fold, means for moving said folder, and a link connected to said moving means, having a slotted connection to said creaser and arranged to lift the creaser out of the way before the completion of the movement of the folder, said slotted link permitting manual movement of the creaser to an inoperative position.

8. In a form-folding machine, a work support, a folder, a creaser for assisting the folder, a holddown for gripping the work against the work support, means for raising said holddown away from the work support, and interengaging means between the creaser and the holddown for causing the creaser to be raised when the holddown is raised and permitting raising of the creaser while the holddown remains in work-engaging position.

9. In a form-folding machine, a work support, a holddown for gripping the work against the support, a creaser spring-pressed against the work adjacent to the holddown, and means on said creaser overlying and engaging said holddown for causing the creaser to follow movements of the holddown while permitting movement of the creaser away from the holddown at all times.

10. In a form-folding machine, a work support, a creaser tiltably mounted about an axis for movement to an inoperative position, and a spring positioned to urge said creaser toward the work support and movable past the axis of the creaser, thereby to hold the creaser in raised inoperative position.

11. In a worm-folding machine, a work support, a holddown movably mounted on the machine, a spring urging said holddown away from the work support, manually controlled means for drawing the holddown against the work on the support, a creaser movably mounted on the machine adjacent to the holddown, and a spring holding said creaser against the holddown in a direction toward the work support.

12. In a form-folding machine, a work support, a holddown mounted for movement toward and away from said work support, releasable latch means for limiting the movement of said holddown in one direction, and a spring urging said latch means into movement limiting position.

13. In a form-folding machine, a work support, a holddown extending transversely of the work support for engagement with the work thereon along a substantially length of the work near the line of fold, and a series of resilient work-engaging fingers on said holddown to accommodate variations in thickness of the work along the length engaged thereby.

14. In a form-folding machine, a work support having a resilient surface, a thin sheet metal strip overlying said resilient surface, means for operating upon a piece of work resting on said sheet metal, and means to tension said strip.

15. In a form-folding machine, a work support, a folder for turning over a margin of the work resting on the support, pivotal supports for said work support positioned at a distance from said folder, springs for urging said work support toward the folder, said springs being off-center with respect to the median line of the work support, and independent means for adjusting the relative lifting effect of said springs.

16. In a form-folding machine, a work support, a folder for turning over a margin of the work on the support, power-operated means for moving said folder, and operator-controlled means for stopping said folder movement when the latter has reached a position substantially normal to the work support.

17. In a form-folding machine, a work support, a folder movable through substantially 180° to turn over a margin of the work, power-operated means for effecting said movement of the folder, and operator-controlled means arranged when actuated in one direction to stop such movement at an intermediate point and when actuated in another direction to permit a continuation of said movement.

18. In a form-folding machine, a work support, a holddown adapted to be brought into engagement with the work, the holddown having a removable work-engaging portion and being movable to an inoperative position to permit changing of the work-engaging portion thereof, a movably mounted folder, power-operated means for moving said folder, operator-controlled means controlling said power-operated means, and means to prevent movement of said operator-controlled means when the holddown is in an inoperative position.

WILLIAM NEIL BRAY.
THOMAS GIMSON HUSBANDS.